M. V. BAUER.
MANICURING INSTRUMENT.
APPLICATION FILED APR. 14, 1920.
1,365,883.
Patented Jan. 18, 1921.
2 SHEETS—SHEET 1.
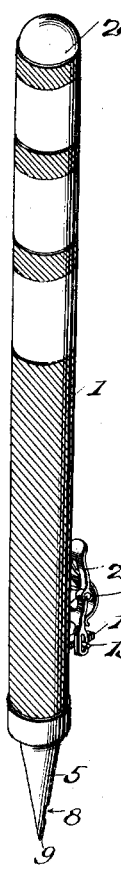
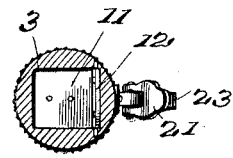
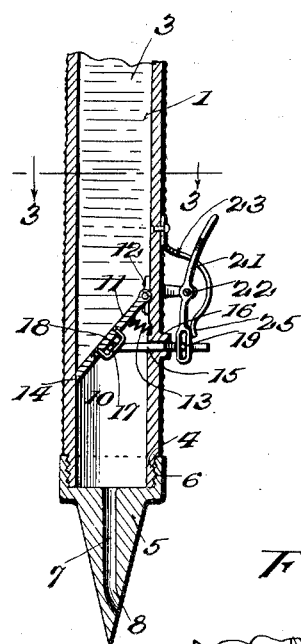
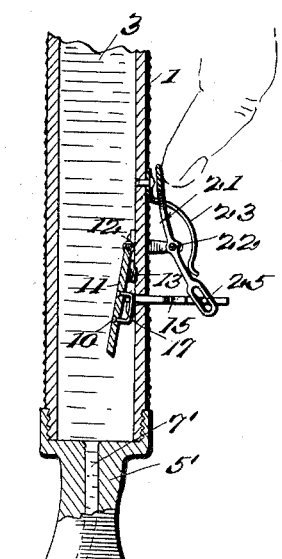
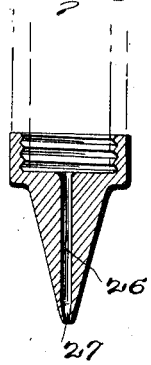
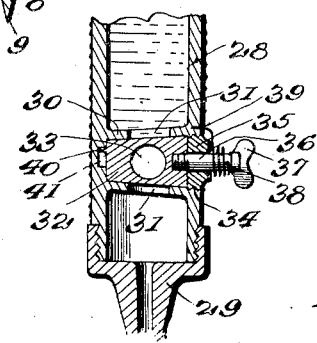
Inventor
M. V. Bauer.
By
Attorneys M. V. BAUER.
MANICURING INSTRUMENT.
APPLICATION FILED APR. 14, 1920.
1,365,883.
Patented Jan. 18, 1921.
2 SHEETS—SHEET 2.
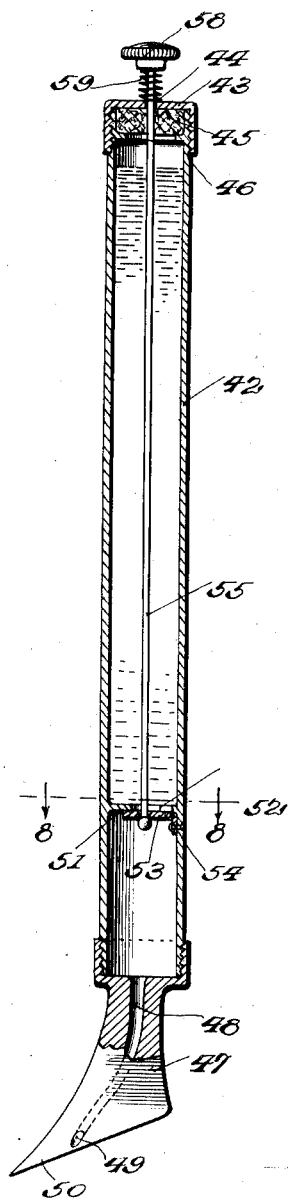
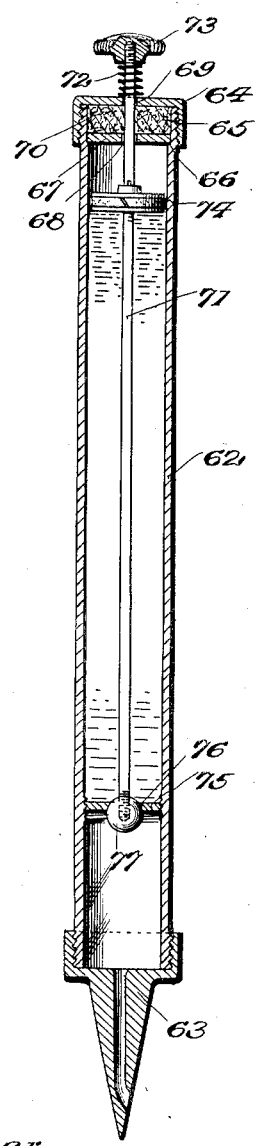
M. V. Bauer,
INVENTOR.
BY
*Lacey & Lacey*
ATTORNEYS

UNITED STATES PATENT OFFICE.

MARTHA V. BAUER, OF WASHINGTON, DISTRICT OF COLUMBIA.

MANICURING INSTRUMENT.

1,365,883.      Specification of Letters Patent.      Patented Jan. 18, 1921.

Application filed April 14, 1920. Serial No. 373,857.

*To all whom it may concern:*

Be it known that I, MARTHA V. BAUER, a citizen of the United States, residing at Washington, District of Columbia, have invented certain new and useful Improvements in Manicure Instruments, of which the following is a specification.

This invention relates to manicure instruments and has as its primary object to provide a desirable substitute for the orange stick usually employed in manicuring the nails. In the ordinary method of procedure it is customary to apply medicaments to the cuticle at the base of the nail by means of cotton wrapped around the tip of an orange stick which is dipped into the medicament frequently in order to keep the cotton moist. This method is inconvenient, however, and the dipping of the orange stick into the medicament involves loss of time and motion which it is a further object of my invention to eliminate.

A further object of the invention is to provide an instrument having a tip which is to serve the purpose of the orange stick usually employed and to which tip liquid medicaments may be supplied in regulated quantities as desired.

Another object of the invention is to provide novel means for controlling the flow of liquid medicament to the tip.

In the accompanying drawings:

Figure 1 is a perspective view of one form of the instrument embodying the present invention;

Fig. 2 is a detail vertical longitudinal sectional view through the lower portion thereof;

Fig. 3 is a horizontal sectional view on the line 3—3 of Fig. 2;

Fig. 4 is a view similar to Fig. 2 but illustrating the valve of the instrument open, and also illustrating a modified form of tip;

Fig. 5 is a view similar to Fig. 2 illustrating a slightly modified form of tip;

Fig. 6 is a similar view illustrating a modified form of valve;

Fig. 7 is a vertical longitudinal sectional view illustrating a modified form of the instrument;

Fig. 8 is a horizontal sectional view on the line 8—8 of Fig. 7;

Fig. 9 is a view similar to Fig. 7 illustrating a further modification of the invention.

In that form of the invention shown in Figs. 1 to 4 inclusive, the instrument is illustrated as comprising a barrel which is indicated in general by the numeral 1 and which may be provided at its top with any suitable removable filling cap 2 to permit of introduction into the barrel of any desired liquid medicament. The bore of the barrel is indicated by the numeral 3 and is preferably of the rectangular contour shown in Fig. 3 of the drawings. The bore 3 opens through the lower end of the barrel as well as through the upper end thereof and the barrel at its said lower end is exteriorly threaded as indicated by the numeral 4. At this end the barrel is provided with a tip which is indicated in general by the numeral 5 and which is preferably of tapered or conical form as clearly shown in the said figures, this tip being provided at its upper or major end with a cylindrical integral collar portion 6 interiorly threaded to fit the threaded end 4 of the barrel as clearly shown in Fig. 2. The tip is formed with an outlet duct 7 which, as illustrated in Fig. 2, may extend at its upper portion axially of the tip but has its lower end portion deflected laterally as indicated by the numeral 8 so as to discharge at one side of the tip and at a point above but relatively close to the working extremity 9 of the said tip. At this point it will be evident that the working point 9 serves precisely the same purpose as the pointed and tapered end of the ordinary orange stick and in fact the tip 5 may be made of this kind of wood. It will also be obvious that any liquid medicament which is permitted to flow from the barrel 1 through the duct 7, will be discharged substantially at the working extremity of the tip and thus may be conveniently applied to the cuticle at the base of a nail being manicured.

In Fig. 4 of the drawings the tip 5 is replaced by a tip 5' which corresponds substantially in shape to the broad end of an orange stick and this tip is formed with a duct 7' corresponding to the duct 7 and having a lower discharge end 8' which opens through one side of the tip substantially at the lower or working edge thereof, which edge is indicated by the numeral 9'.

In order that the supply of liquid medicament to the tip of the instrument may be regulated and controlled as desired, a valve device is provided and this device will now be described. The valve device comprises a valve proper which is indicated in general by the numeral 10 and which comprises a rectangular plate 11 hingedly mounted as at 12 within the bore 3 of the barrel 1 at one side of the bore and normally held in substantially the inclined position shown in Fig. 2 and with its free edge bearing against the opposite wall of the bore, by means of a coil spring 13 disposed between the back of the plate and the first mentioned wall of said bore. The said free edge of the valve plate is preferably beveled as indicated by the numeral 14 so as to provide a fluid-tight fit against the wall of the bore and thus prevent the passage of the liquid contained in the bore from the upper portion thereof to the lower portion. By reason of the provision of this valve, any liquid medicament introduced into the barrel through the upper end thereof will be retained until the valve is opened or partly opened whereupon some of the liquid will be permitted to flow to the lower end of the barrel and out through the duct 7. In order that the valve may be moved to open position, an actuating means is provided and the same includes a valve stem 15 which is slidably fitted in a liquid-tight manner through an opening 16 formed in the wall of the barrel and at its inner end is provided with a lateral finger 17 working in a bail 18 upon the rear or under side of the valve plate. Exteriorly of the barrel the stem 15 is provided with a laterally projecting stud 19 engaged by the slotted lower end 20 of an actuating finger lever 21 which is pivotally mounted as at 22 in any appropriate manner upon the exterior of the barrel 1. A bowed leaf spring 23 is secured at its upper end to the outer side of the barrel and is curved outwardly and downwardly through a slot 24 formed in the actuating lever 21 and bears at its free lower end 25 against the slotted lower end of the said lever. This spring not only serves to normally yieldably hold the lever in the position shown in Fig. 2 of the drawings but it also holds the valve stem 15 normally slid inwardly and therefore assists the spring 13 in holding the valve plate in closed position. When it is desired to swing the valve to open position so as to discharge some of the liquid through the duct 7, the upper end of the actuating lever 21 may be pressed inwardly as shown in Fig. 4 of the drawings whereupon the stem 15 will be slid outwardly and the valve will be moved as stated and as shown in Fig. 4.

In the modified structure shown in Fig. 5 of the drawings, the duct which is indicated by the numeral 26, is extended throughout its entire length axially of the tip and therefore opens at its lower end 27 directly through the apex or working point of the tip.

If desired, a rotary plug valve may be provided as shown in Fig. 6 of the drawings in place of the gate valve above described and in this figure the numeral 28 indicates the barrel of the instrument and 29 the tip thereof, the barrel being formed interiorly with an interiorly conical valve casing 30 having diametrically opposed openings or ports 31 through which the liquid may flow. The valve proper comprises a plug 32 which is rotatably fitted into the casing 30 and has a transverse port 33 which may be brought into alinement with the openings 31 when the valve is rotated to one position but which is normally out of alinement with these openings as shown in the said figure so as to normally prevent the flow of liquid. The plug 32 is to be inserted into the valve casing 30 through an opening 34 formed in the wall of the barrel 28 and this opening is to be closed by means of a suitable bushing 35 through which is rotatably extended the stem 36 of the valve and which stem is provided at its outer end with a finger piece 37 whereby the valve may be rotated within its casing. A spring 38 is coiled about the stem 36 and is secured at one end to the said stem and at its other end as at 39 to the wall of the barrel and serves to yieldably hold the valve plug rotated in one direction, it being understood that the valve may be manually rotated in the opposite direction against the tension of the spring by means of the finger piece 37 upon the stem of the valve. Movement of the valve to its open and closed positions is limited by means of a stud 40 which is carried by the minor end of the valve plug and works in an arcuate groove 41 formed in the wall of the barrel 28, the said stud being designed to contact the end walls of the groove for the purpose stated.

In that form of the invention shown in Fig. 7 of the drawings, the instrument comprises a barrel which is indicated by the numeral 42 and which is open at its lower end and has fitted to its upper end a cap 43 having a central aperture 44 the purpose of which will be presently explained. When in place, the cap 43 bears against and compresses a suitable packing 45 disposed within the upper end of the barrel and supported upon an annular ledge or flange 46 formed circumferentially within the barrel.

In this form of the invention the tip of the instrument, which is indicated in general by the numeral 47, is of the angular form shown in the figure and previously described in connection with Fig. 4 and therefore corresponds substantially in its contour to the broad end of an orange stick. The said tip 47 is formed with a duct 48 the discharge end 49 of which opens through one side of the tip 47 near the working lower edge 50 thereof.

An approximately semi-circular diaphragm 51 is provided within the barrel 42 near the lower end of the latter and is formed with an opening 52 and the lower side of this diaphragm comprises a valve seat against which normally rests a flap valve 53 hinged as at 54 upon the inner side of the wall of the barrel. A valve stem 55 forms a part of this valve 53 and this stem extends upwardly axially within the barrel 42 and through the packing 45 and the opening 44 to the exterior of the barrel. A finger knob 58 is fitted to the upper end of the valve stem 55, and a coil spring 59 is arranged upon the projecting end of the stem and bears at its upper end against the under side of the knob 58 and at its lower end against the upper side of the barrel 42, the spring normally yieldably holding the valve stem in an elevated position and thus holding the valve 53 in closed position. In order to discharge liquid from the barrel it is only necessary to depress the knob 58 thus imparting corresponding motion to the valve stem and swinging the valve downwardly to open position.

In the form of the invention illustrated in Fig. 10 of the drawings, the instrument comprises a barrel which is indicated by the numeral 62. A tip 63 is fitted onto the lower end of the barrel and corresponds substantially to the tip 5 heretofore described. At its upper end the barrel is interiorly increased in diameter as at 65 so as to provide a circumscribing shoulder or ledge 66 upon which is disposed to rest the periphery of a disk 67 having a central aperture 68 which is in vertical alinement with an aperture 69 formed in the top of the cap 64, a packing 70 being compressed between the cap and the said disk. A valve stem 71 is slidably fitted through the openings 68 and 69 and through the packing 70 and is normally yieldably held in an elevated position by means of a coil spring 72 which is fitted onto its projecting upper end and bears between the lower side of a knob 73 and the upper side of the cap 64, the said knob being preferably threaded onto the upper end of the said stem. A piston head 74 is preferably secured upon the valve stem 71 at a point below the disk 67 and it will be understood that inasmuch as this piston fits the barrel in an air-tight manner, when the stem 71 is pressed inwardly by pressure being exerted upon the knob 73, the liquid within the barrel will be more or less forcibly ejected. In order that the liquid may, however, be normally retained within the barrel, the barrel is formed near its lower end with a diaphragm 75 provided centrally with an opening surrounded by a valve seat 76, and a globular or similarly formed valve 77 is removably fitted onto the lower end of the stem 71 and is normally held to this seat by the action of the spring 72 in lifting the valve stem. Of course, upon depressing the knob 73 the valve will be moved to open position and simultaneously the piston 74 will act to eject or force the liquid contained in the barrel out through the opening in the diaphragm 75 and finally through the duct in the tip 63.

It will be readily understood that any of the instruments herein illustrated and described may be filled by removing the tip from the lower end of the barrel, the said tip being again threaded onto the barrel after the desired quantity of liquid has been introduced into the barrel.

Having thus described my invention, what is claimed as new is:

1. A manicure instrument comprising a barrel having a working tip provided with a duct communicating with the interior of the barrel, a valve hinged within the barrel and movable to position to extend across and close the barrel and to position to permit flow of liquid through the barrel to the duct of the tip, and means extending exteriorly of the barrel for actuating the valve.

2. A manicure instrument comprising a barrel having a working tip provided with a duct communicating with the interior of the barrel, a valve hinged within the barrel and movable to position to extend across and close the barrel and to position to permit flow of liquid through the barrel to the duct of the tip, and means extending exteriorly of the barrel for actuating the valve, the said means including a stem connected with the valve and slidably fitted through one wall of the barrel, and a rocking finger piece mounted upon the exterior of the barrel and operatively connected with the said stem.

3. A manicure instrument comprising a barrel having a working tip provided with a duct communicating with the interior of the barrel, a valve hinged within the barrel and movable to position to extend across and close the barrel and to position to permit flow of liquid through the barrel to the duct of the tip, and means extending exteriorly of the barrel for actuating the valve, the said means including a stem connected with the valve and slidably fitted through one wall of the barrel, a rocking finger piece mounted upon the exterior of the barrel and operatively connected with the said stem, and a spring upon the barrel engaging the said rocking finger piece and normally holding the same in position with the stem shifted inwardly.

4. A manicure instrument comprising a barrel having a working tip provided with a fluid conduit communicating with the interior of the barrel, a valve arranged within the barrel near the lower end thereof and closing communication between upper and lower portions thereof whereby fluid contained within the upper portion of the barrel will be prevented by the valve from flowing to the conduit in the work tip at the lower end of the barrel, and means operable to open the said valve.

5. A manicure instrument comprising a barrel to contain a fluid, and a working tip operatively connected with the barrel and having an inclined working portion, the tip having a duct communicating with the barrel and arranged to discharge at one side of the tip substantially at the said inclined working portion.

In testimony whereof I affix my signature.

MARTHA V. BAUER. [L. S.]